United States Patent
Langhammer et al.

(10) Patent No.: US 11,216,249 B2
(45) Date of Patent: Jan. 4, 2022

(54) METHOD AND APPARATUS FOR PERFORMING FIELD PROGRAMMABLE GATE ARRAY PACKING WITH CONTINUOUS CARRY CHAINS

(71) Applicant: Intel Corporation, Santa Clara, CA (US)

(72) Inventors: Martin Langhammer, Alderbury (GB); Gregg William Baeckler, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 15/937,347

(22) Filed: Mar. 27, 2018

(65) Prior Publication Data

US 2019/0042674 A1 Feb. 7, 2019

Related U.S. Application Data

(60) Provisional application No. 62/616,929, filed on Jan. 12, 2018.

(51) Int. Cl.
*G06F 30/327* (2020.01)
*G06F 7/53* (2006.01)
*G06N 20/00* (2019.01)
*G06F 7/544* (2006.01)
*G06F 30/34* (2020.01)
*G06F 30/392* (2020.01)
*G06F 30/394* (2020.01)
*G06F 111/04* (2020.01)
*G06F 111/20* (2020.01)
*G06F 119/12* (2020.01)

(52) U.S. Cl.
CPC .......... *G06F 7/5312* (2013.01); *G06F 7/5306* (2013.01); *G06F 7/5443* (2013.01); *G06F 30/327* (2020.01); *G06F 30/34* (2020.01); *G06F 30/392* (2020.01); *G06F 30/394* (2020.01); *G06N 20/00* (2019.01); *G06F 2111/04* (2020.01); *G06F 2111/20* (2020.01); *G06F 2119/12* (2020.01)

(58) Field of Classification Search
CPC ...... G06F 7/5312; G06F 30/34; G06F 30/327; G06F 30/392; G06F 30/394; G06F 7/5306; G06F 7/5443; G06F 2111/04; G06F 2111/20; G06F 2119/12; G06N 20/00
See application file for complete search history.

(56) References Cited

U.S. PATENT DOCUMENTS

| | | | | |
|---|---|---|---|---|
| 6,092,093 A | * | 7/2000 | Bayha | H04J 1/08 370/210 |
| 6,708,190 B1 | * | 3/2004 | Jones | G06F 7/5443 326/39 |
| 7,003,545 B1 | * | 2/2006 | Mohammed | G06F 7/501 708/711 |
| 8,732,639 B1 | * | 5/2014 | Fung | G06F 30/3312 716/108 |
| 2009/0267643 A1 | * | 10/2009 | Lewis | G06F 7/506 326/38 |

* cited by examiner

*Primary Examiner* — Nghia M Doan

(57) ABSTRACT

A method for designing a system on a target device includes identifying a length for a carry chain that is supported by predefined quanta of a resource on the target device. A plurality of logical adders is mapped onto a single logical adder implemented on the carry chain subject to the identified length to increase logic utilization in a design for the system.

25 Claims, 16 Drawing Sheets

| 0 | 1 | 2 | 3 | 4 | 5 | 6 | 7 |
|---|---|---|---|---|---|---|---|
| D | C | B | A | 0 | 0 | | |
| 0 | H | G | F | E | 0 | 0 | 0 |
| | | L | K | J | I | M | 0 |
| | | 0 | Q | P | N | | |

FIG. 6

| 0 | 1 | 2 | 3 | 4 | 5 | 6 | 7 | 8 | 9 |
|---|---|---|---|---|---|---|---|---|---|
| C | B | A | 0 | 0 | K | J | I | 0 | 0 |
| H | G | F | E | 0 | Q | P | N | M | 0 |
| P0 | P1 | P2 | P3 | P4 | P5 | P6 | P7 | P8 | P9 |

FIG. 7A

| 0 | 1 | 2 | 3 | 4 | 5 |
|---|---|---|---|---|---|
| P1 | P2 | P3 | P4 | 0 | 0 |
| L | P5 | P6 | P7 | P8 | P9 |
| S2 | S3 | S4 | S5 | S6 | S7 |

FIG. 7B

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 1 | 2 | 3 | 4 | 5 | 6 | 7 | 8 | 9 | 10 | 11 | 12 | 13 | 14 | 15 |
| C | B | A | 0 | 0 | K | J | I | 0 | 0 | P1 | P2 | P3 | P4 | 0 | P9 |
| H | G | F | E | 0 | Q | P | N | M | 0 | L | P5 | P6 | P7 | P8 | S7 |
| P0 | P1 | P2 | P3 | P4 | P5 | P6 | P7 | P8 | P9 | S2 | S3 | S4 | S5 | S6 | S7 |

FIG. 8

| 0 | 1 | 2 | 3 | 4 | 5 | 6 | 7 | 8 |
|---|---|---|---|---|---|---|---|---|
| D | C | B | A |   |   |   |   |   |
|   | H | G | F | E |   |   |   |   |
|   |   | L | K | J | I |   |   |   |
|   |   |   | Q | P | N | M |   |   |

FIG. 9

| 10 | 9 | 8 | 7 | 6 | 5 | 4 | 3 | 2 | 1 | 0 |
|---|---|---|---|---|---|---|---|---|---|---|
| 0 | I xor M* | I | I | J | K | A xor E | A | A | B | C |
| 0 | 0 | M* | N* | P* | Q* | 0 | E | F | G | H |
| X | P9 | P8 | P7 | P6 | P5 | P4 | P3 | P2 | P1 | P0 |

FIG. 10A

| 0 | 1 | 2 | 3 | 4 | 5 |
|---|---|---|---|---|---|
| P1 | P2 XOR P5 | P3 XOR P6 | P4 XOR P7 | P4 XOR P8 | P4 XOR P9 |
| L | B[3] | P2 AND P5 | P3 AND P6 | P4 AND P7 | P4 AND P8 |
| S2 | S3 | S4 | S5 | S6 | S7 |

FIG. 10B

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| P4 XOR P9 | P4 XOR P8 | P4 XOR P7 | P3 XOR P6 | P2 XOR P5 | P1 | 0 | I XOR M* | I | I | J | K | A XOR E | A | A | B | C |
| P4 AND P8 | P4 AND P7 | P3 AND P6 | P2 AND P5 | B[3] | L | 0 | 0 | M* | N* | P* | Q* | 0 | E | F | G | H |
| | S7 | S6 | S5 | S4 | S3 | S2 | X | P9 | P8 | P7 | P6 | P5 | P4 | P3 | P2 | P1 | P0 |

FIG. 11

METHOD AND APPARATUS FOR PERFORMING FIELD PROGRAMMABLE GATE ARRAY PACKING WITH CONTINUOUS CARRY CHAINS

RELATED APPLICATION

This application claims benefit and priority to Provisional U.S. Patent Application No. 62/616,929 filed on Jan. 12, 2018, entitled "Synthesis for FPGA Embedded Feature Placement", the full and complete subject matter of which is hereby expressly incorporated by reference in its entirety.

FIELD

Embodiments of the present disclosure relate to tools for designing systems on target devices. More specifically, embodiments of the present disclosure relate to a method and apparatus for performing field programmable gate array packing with continuous carry chains.

BACKGROUND

Target devices such as field programmable gate arrays (FPGAs), application specific integrated circuits (ASICs), and structured ASICs are used to implement large systems that may include millions of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

As the demand for low precision multipliers for systems increases for various applications, the need arises for target devices to efficiently pack adders used for implementing the multipliers such that a large percentage of the logic on the target device is utilized. Current EDA tools encounter the challenge of efficiently packing adders that perform optimally on a target device within a reasonable amount of design compilation time.

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 6 illustrates an example of 4×4 unsigned multiplier partial products arranged to be processed by a plurality of broken carry chains according to an exemplary embodiment of the present disclosure.

FIG. 7A illustrates an example of 4×4 unsigned multiplier partial products arranged to be processed by a continuous carry chain according to an exemplary embodiment of the present disclosure.

FIG. 7B illustrates an example of a 4×4 unsigned multiplier summed partial products for computing a final sum arranged to be processed by a continuous carry chain according to an exemplary embodiment of the present disclosure.

FIG. 8 illustrates an example of 4×4 unsigned multiplier partial products and summed partial products arranged to be processed by a continuous carry chain according to an embodiment of the present disclosure.

FIG. 9 illustrates an example of 4×4 signed multiplier partial products arranged to be processed by a plurality of broken carry chains according to an exemplary embodiment of the present disclosure.

FIG. 10A illustrates an example of 4×4 signed multiplier partial products arranged to be processed by a continuous carry chain according to an exemplary embodiment of the present disclosure.

FIG. 10B illustrates an example of a 4×4 signed multiplier summed partial products for computing a final sum arranged to be processed by a continuous carry chain according to an exemplary embodiment of the present disclosure.

FIG. 11 illustrates an example of 4×4 signed multiplier partial products and summed partial products arranged to be processed by a continuous carry chain according to an embodiment of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
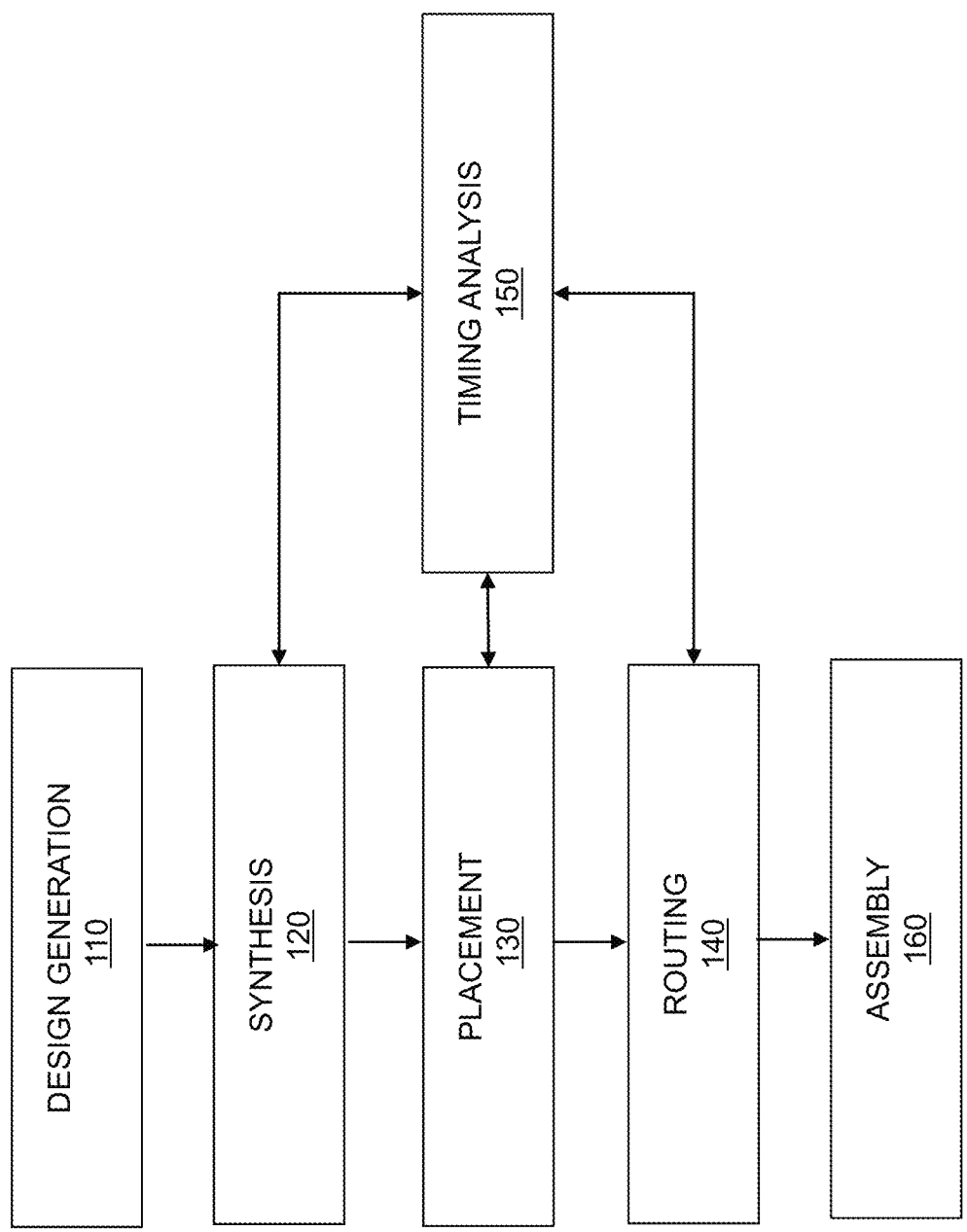
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The procedures described in FIG. 1 may collectively be referred to as "compilation" of a design. The target device may be a field programmable gate array (FPGA), application specific integrated circuit (ASIC), a structured ASIC, or other device whose functionality is described by a hardware description language (HDL). At 110, a design for the system is generated. According to an embodiment of the present disclosure, the design is generated in response to input provided by a user. In this embodiment, the user may input a register-transfer-level (RTL) description of the system, select and connect logic from a design library, or utilize other design input options. Alternatively, the input provided by the user may be a computer language description of the system. In this embodiment, a high-level compilation of the computer language description of the system is performed. The design for the system generated may be in HDL.

At 120, the system is synthesized and a netlist is generated. Synthesis includes generating a logic design of the system to be implemented by the target device. According to an embodiment of the present disclosure, synthesis generates an optimized logical representation of the system from an HDL design definition. Synthesis also includes mapping the optimized logic design (technology mapping). Mapping includes determining how to implement logic gates and logic elements in the optimized logic representation with specific resources on the target device such as logic elements and functional blocks. According to an embodiment of the present disclosure, a netlist is generated from mapping. This netlist may be an optimized technology-mapped netlist generated from the HDL.

At 130, the system is placed. According to an embodiment of the present disclosure, placement involves placing the mapped logical system design on the target device. Placement works on the technology-mapped netlist to produce a placement for each of the logic elements and functional blocks. According to an embodiment of the present disclosure, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present disclosure, clustering is performed at an early stage of placement and occurs after synthesis during the placement preparation stage. Placement may also minimize the distance between interconnected resources to meet timing constraints of the timing netlist.

According to an embodiment of the present disclosure, packing with continuous carry chains is performed during compilation. Packing with continuous carry chains involves utilizing a single continuous carry chain to implement a plurality of logical adders by mapping the plurality of logical adder onto a single logical adder. By mapping common arithmetic functions onto a carry chain that snaps to a natural logic boundary of a target device, logic utilization of the target device increases. Packing with continuous carry chains may be performed during design generation 110, technology mapping during synthesis 120, clustering during placement 130, or during other procedures in compilation.

At 140, the placed design is routed. During routing, routing resources on the target device are allocated to provide interconnections between logic gates, logic elements, and other components on the target device. According to an embodiment of the present disclosure, routing aims to reduce the amount of wiring used to connect components in the placed logic design. Routability may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 150, timing analysis is performed on the system designed. According to an embodiment of the present disclosure, the timing analysis determines whether timing constraints of the system are satisfied. As part of timing analysis, slack analysis may be performed. It should be appreciated that the timing analysis may be performed during and/or after each of the synthesis 120, placement 130, and routing procedures 140 to guide compiler optimizations.

At 160, an assembly procedure is performed. The assembly procedure involves creating a program file that includes information determined by the procedures described at 110, 120, 130, and 140. The program file may be a bit stream that may be used to program a target device. In the case of an ASIC, the program file may represent the physical layout of the circuit. According to an embodiment of the present disclosure, the procedures illustrated in FIG. 1 may be performed by an EDA tool executed on a first computer system. The program file generated may be transmitted to a second computer system to allow the design of the system to be further processed. The program file may be transmitted from either the first or second computer system onto the target device and used to program the target device according to the system design. It should be appreciated that the design of the system may also be output in other forms such as on a display device or other medium. The target device may be programmed with the program file. By programming the target with the program file, components (programmable resources) on the target device are physically transformed to implement the system.

Figure 2:
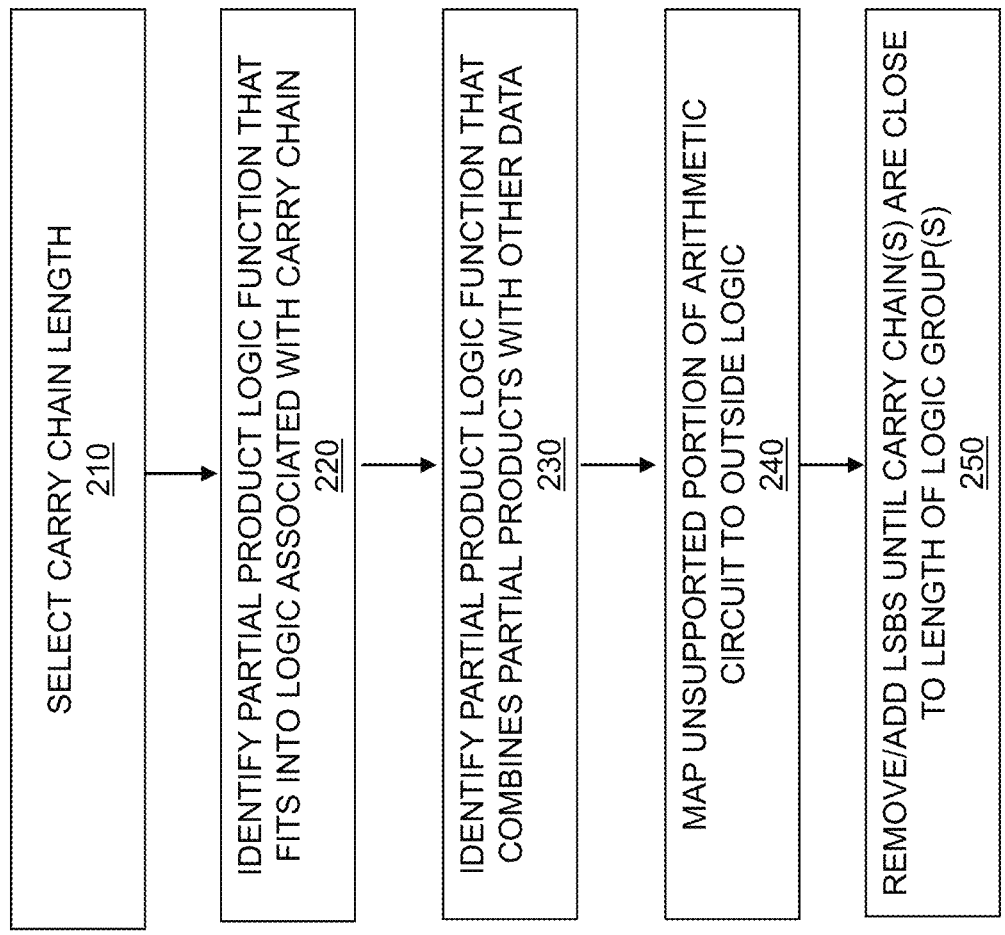
FIG. 2 is a flow chart illustrating a method for performing field programmable gate array packing with a continuous carry chain according to an exemplary embodiment of the present disclosure.

FIG. 2 is a flow chart illustrating a method for performing field programmable gate array packing with a continuous carry chain according to an exemplary embodiment of the present disclosure. The continuous carry chain may be used to implement an arithmetic block that includes a plurality of logical adders. With reference to FIG. 1, the procedures illustrated in FIG. 2 may be performed during design generation 110, technology mapping during synthesis 120, clustering during placement 130, or during other stages during compilation. At 210, a carry chain length is selected. The carry chain length may include the entire arithmetic block or a subset of the arithmetic block. According to an embodiment of the present disclosure, the carry chain length is selected in response to a length that is supported by predefined quanta of a resource on a target device that allows the carry chain to be packed efficiently on the target device with other carry chains. In one embodiment, where the target device is a FPGA and a resource is a logic array block (LAB), the predefined quanta may be an integer multiple of the LAB or an integer multiple of a half of a LAB. For example, where a LAB may support a 20-bit carry chain, the length of the carry chain selected may be, for example, 10, 20, 30, or 40 bits.

At 220, a partial product logic function is identified that fits into logic associated with the carry chain. According to an embodiment of the present disclosure, logic associated with the carry chain includes logic residing in the resource on the target device supporting the carry chain. It should be appreciated that procedure 220 may be repeated to continue to identify additional partial product logic functions to map into logic associated with the carry chain until all partial product logic functions associated with the arithmetic block have been considered.

According to an embodiment of the present disclosure, one or more bit positions on the carry chain are designated to terminate a carry ripple. The designated positions are ones where no overflow can occur when summing values from the partial product logic functions. This allows values to be summed from a subsequent logical adder to be placed in the next bit position on the carry chain.

At 230, a partial product summation logic function, that combines partial products generated from the partial product logic functions and also with other data, is identified that fits into logic associated with the carry chain. It should be appreciated that procedure 230 may be repeated to continue to identify additional partial product summation logic functions to map into logic associated with the carry chain until all partial product summation logic functions associated with the arithmetic block have been considered.

According to an embodiment of the present disclosure, one or more bit positions on the carry chain are designated to terminate a carry ripple. The designated positions are ones where no overflow can occur when summing values from the partial product summation logic functions. This allows values to be summed from a subsequent logical adder to be placed in the next bit position on the carry chain.

At 240, portions of an arithmetic circuit unsupported by the logic associated with the carry chain are mapped to logic not associated with the carry chain. Routing is assigned to connect the logic not associated with the carry chain to the logic associated with the carry chain.

At 250, least significant bits of partial products are removed or added from operations of the carry chain until a length required for the carry chain is closest to the selected carry chain length. According to an embodiment of the present disclosure, a least significant bit may be removed by putting it into logic not associated with the carry chain, thereby shortening the carry chain. Alternatively, a least significant bit may be taken from logic not associated with the carry chain and inserted into the carry chain to make the carry chain longer. It should be appreciated that most significant bits of partial products may also be removed or added from operations of the carry chain until a length required for the carry chain is closest to the selected carry chain length in the manner described above. In other contemplated embodiments, helper functions computing bits between the least significant bits and the most significant bits may also be removed by putting it into logic not associated with the carry chain.

Previous FPGA multiplier research focused on logic minimization, such as reducing the amount of logic required for partial product generation. In some cases, a higher radix such as Booth 4 or Booth 8 were used in order to minimize the size of the adder tree. However, there still existed a number of partial product elements and a number of adder tree elements which were treated as independent components. This made placing and routing components of a multiplier difficult. The compilation process required a large amount of time and logic utilization was very low. As described in the procedure illustrated in FIG. 2, a carry chain is first selected, and then afterwards the rest of the logic for the arithmetic block is mapped around the carry chain. The single carry chain is used to implement the entire multiplier. The partial products and all the adder trees are mapped to the single continuous carry chain. This provides a potential technical advantage of increasing logic utilization and improving performance of the multiplier. Placement time during compilation is also reduced. The procedures described are improvements to the technical field of system design in particular in the area of FPGA packing of continuous carry chains. The procedures provide improvement to existing technological procedures for packing continuous carry chains in FPGAs.

FIGS. 1 and 2 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 3:
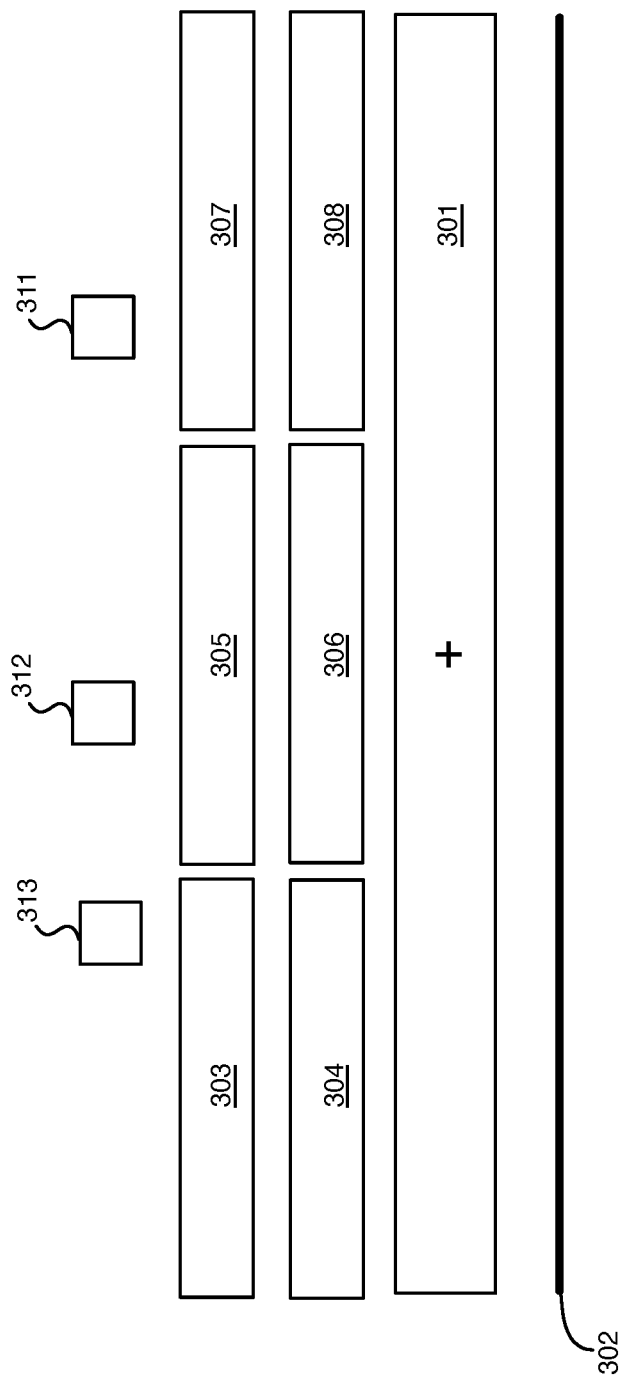
FIG. 3 is a conceptual illustration of field programmable gate array packing with a continuous carry chain according to an exemplary embodiment of the present disclosure.

FIG. 3 is a conceptual illustration of field programmable gate array packing with a continuous carry chain according to an exemplary embodiment of the present disclosure. Block 301 represents a continuous carry chain. The continuity of the continuous carry chain 301 is illustrated by continuous line 302. The continuous carry chain 301 may be implemented by predefined quanta of resources on a target device, where the predefined quanta is determined to yield favorable packing and logic utilization on the target device. According to an embodiment of the present disclosure where the target device is a FPGA, the resource may be a logic array block, and the quanta may be an integer multiple of a whole or half logic array block.

Blocks 303-308 represent logic associated with the continuous carry chain 301. Logic associated with the continuous carry chain 301 includes logic supported by the predefined quanta of resources used for implementing the continuous carry chain 201. Referring back to FIG. 2, the partial product logic functions identified at 220 and the partial product summation logic functions identified at 230 may be fit (mapped) onto the logic 303-308 associated with the continuous carry chain 301.

Referring back to FIG. 3, blocks 311-313 represent logic that is not associated with the continuous carry chain 301. According to an embodiment of the present disclosure, logic 311-313 is not associated with the continuous carry chain when it is implemented by logic that is not supported by the predefined quanta of resources used for implementing the continuous carry chain. Referring back to FIG. 2, the portions of the arithmetic circuit unsupported by the logic associated with the carry chain at 240 may be fit (mapped) onto logic 311-313.

Figure 4:
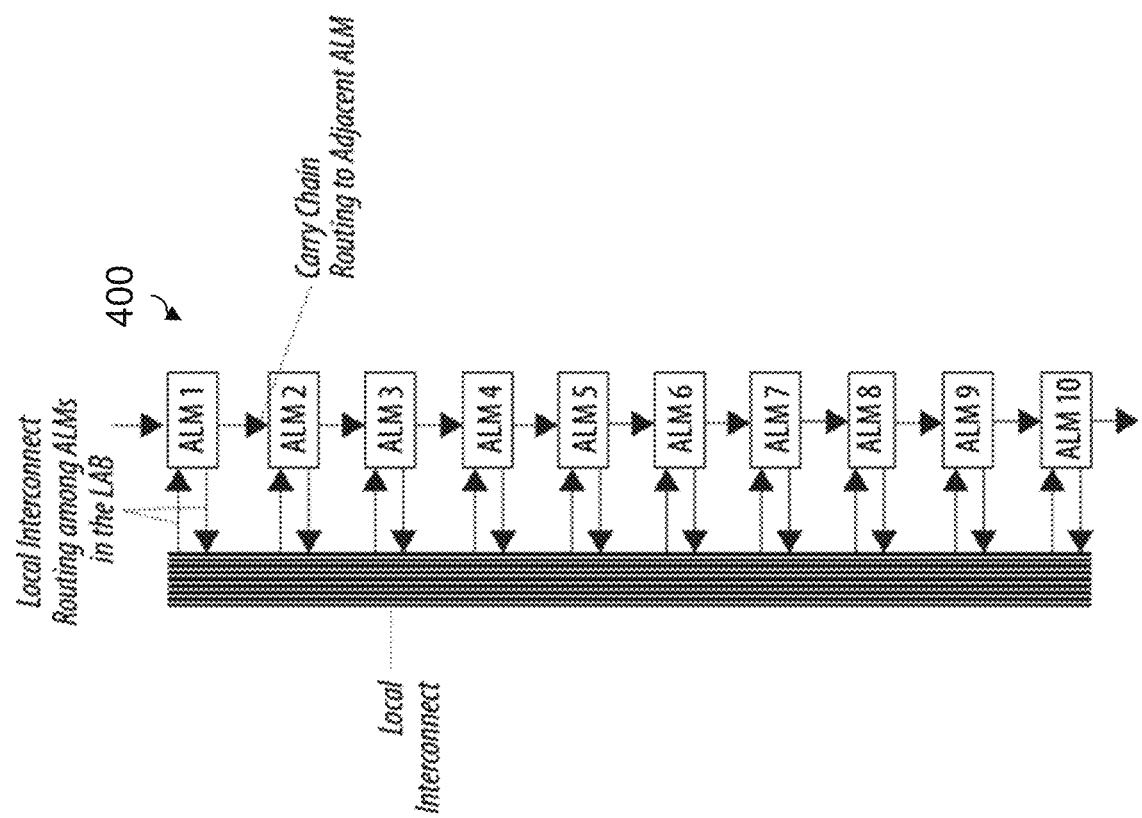
FIG. 4 illustrates a continuous carry chain according to an exemplary embodiment of the present disclosure.

FIG. 4 illustrates a carry chain 400 according to an exemplary embodiment of the present disclosure. The carry chain is implemented by a plurality of adaptive logic modules (ALMs) from a field programmable gate array. In one embodiment, each ALM may include a plurality of combinational adaptive look up tables (LUT), a two-bit full adder, and four registers. In the embodiment of the carry chain 400 shown in FIG. 4, ALM 1-ALM 10 support a 20-bit length carry chain. Each ALM is connected serially to at least one other ALM. ALM 1-ALM 10 reside in a same logic array block and are connected to a local interconnect routing among ALMs in the logic array block.

The carry chain 400 is considered continuous when it operates as a single carry chain to support a single logical adder. Embodiments of the present disclosure map a plurality of logical adders onto a single logical adder implemented by the carry chain 400.

Figure 5:
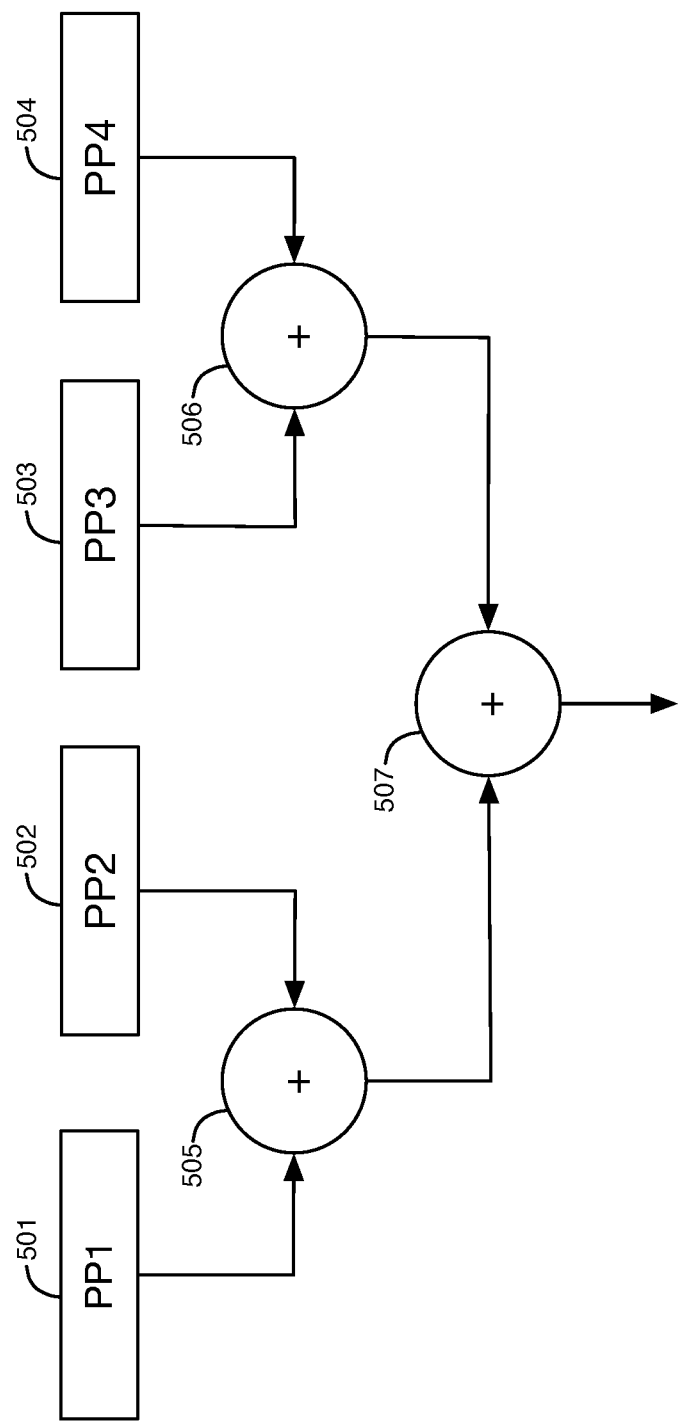
FIG. 5 illustrates a representation of arithmetic functions performed by a 4×4 multiplier according to an exemplary embodiment of the present disclosure.

FIG. 5 illustrates a representation of arithmetic functions performed by a 4×4 multiplier according to an exemplary embodiment of the present disclosure. A plurality of partial products are generated by partial product logic 1 (PP1) 501, partial product logic 2 (PP2) 502, partial product logic 3 (PP3) 503, and partial product logic 4 (PP4) 504. The partial products and sums of the partial products are summed by logical adders 505, 506, and 507 that form an adder tree. If the number of partial products is a power of 2, a balanced adder tree may be used. If the number of the partial products is not a power of 2, a structure as close as possible to a balanced tree may be used.

Figure 6:
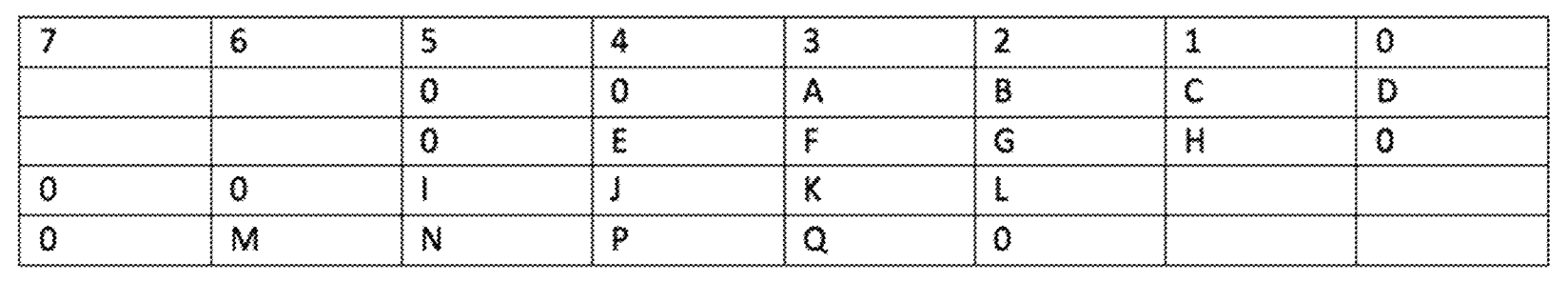

FIG. 6 illustrates an example of 4×4 unsigned multiplier partial products arranged to be processed by a plurality of broken (non-continuous) carry chains according to an exemplary embodiment of the present disclosure. Each bit is a product of a multiplicand bit and a multiplier bit. In this example, the multiplicand is X[3:0] and the multiplier is Y[3:0]. The bit values for A, B, C, and D are X[3] AND Y[0], X[2] AND Y[0], X[1] AND Y[0], and X[0] AND Y[0], respectively. The bit values for E, F, G, and H are X[3] AND Y[1], X[2] AND Y[1], X[1] AND Y[1], and X[0] AND Y[1], respectively. The bit values for I, J, K, and L are X[3] AND Y[2], X[2] AND Y[2], X[1] AND Y[2], and X[0] AND Y[2], respectively. The bit values for M, N, P, and Q are X[3] AND Y[2], X[2] AND Y[2], X[1] AND Y[2], and X[0] AND Y[2], respectively.

In this example, A, B, C, and D may represent a partial product from partial product logic 1 501 (shown in FIG. 5). E, F, G, and H may represent a partial product from partial product logic 2 502 (shown in FIG. 5). I, J, K, and L may represent a partial product from partial product logic 3 503 (shown in FIG. 5). M, N, P, and Q may represent a partial product from partial product logic 4 504 (shown in FIG. 5). The logic function required for generating each of the bits of the partial products is an AND function.

FIG. 7A illustrates an example of 4×4 unsigned multiplier partial products arranged to be processed by a continuous carry chain according to an exemplary embodiment of the present disclosure. Referring back to FIG. 6, it can be seen that the first two partial products, when added, can never overflow past the bit 5 position. As such, the summation of the second two partial products can be concatenated to a single ripple adder starting with the first partial product. This is shown in FIG. 7A. The bit 4 position in FIG. 7A is designated as a position where no overflow can occur when summing values from a logical adder such that values to be summed by another logical adder can be placed at the next bit position. Similarly, the bit 9 position in FIG. 7A is also designated as a position where no overflow can occur when summing values from a logical adder such that values to be summed by another logical adder can be placed at the next bit position. Note also from FIG. 6 that "D" is not added to any value, and can therefore be left off of the carry chain as shown in FIG. 7A.

FIG. 7B illustrates an example of a 4×4 unsigned multiplier summed partial products for computing a final sum arranged to be processed by a continuous carry chain according to an exemplary embodiment of the present disclosure. It can be seen that when the summed partial products are added, no overflow will occur past the bit 5 position. The bit 5 position in FIG. 7B is designated as a position where no overflow can occur when summing values from a logical adder such that values to be summed by another logical adder can be placed at the next bit position. As such, a second multiplier can be appended immediately to the first multiplier after the bit 5 position. It should be noted that additional logic is required to process and store two respective least significant bits, S1=P0, and S0=D.

FIG. 8 illustrates an example of 4×4 unsigned multiplier partial products and summed partial products arranged to be processed by a continuous carry chain according to an embodiment of the present disclosure. The 10-bit carry chain from FIG. 7A may be appended with the 6-bit carry chain from FIG. 7B. As shown, a single 16-bit carry chain may be used to implement the 4×4 unsigned multiplier. This single 16-bit carry chain may be implemented by the 20-bit carry chain illustrated in FIG. 4.

As described with reference to FIGS. 4-8, a carry chain of length 20 may be selected to implement a 4×4 unsigned multiplier. An exemplary embodiment of this carry chain is illustrated in FIG. 4. (Procedure 210 from FIG. 2) Partial product logic functions executed by partial product logic 1 501, partial product logic 2 502, partial product logic 3 503, and partial product logic 4 504, from FIG. 5, to generate partial products A, B, C, and D, E, F, G, and H, I, J, K, and L, and M, N, P, and Q, were selected to be implemented by logic associated with the carry chain. (Procedure 220 from FIG. 2) Partial product logic functions executed by adders 505, 506, and 507, from FIG. 5, to generate P0-P8, and S0-S7 were selected to be implemented by logic associated with the carry chain. (Procedure 230 from FIG. 2) As shown in FIG. 6, since "D" is not added to anything, it is removed from the carry chain and mapped to logic not associated with the carry chain. (Procedure 240 from FIG. 2) As shown in FIG. 8, the 4×4 unsigned multiplier may be implemented with only 16-bits of the selected 20-bit carry chain. The value "D" may optionally be taken from the logic not associated with the carry chain and inserted into the carry chain in order to utilize the unused bits in the 20-bit carry chain. (Procedure 250 from FIG. 2)

FIGS. 6-8 illustrate an example of using a continuous carry chain for discontinuous arithmetic in an unsigned multiplier. It should be appreciated that a continuous carry chain may also be used for discontinuous arithmetic in a signed multiplier. Additional logic may be required to provide sign calculation for a signed magnitude number.

Figure 9:
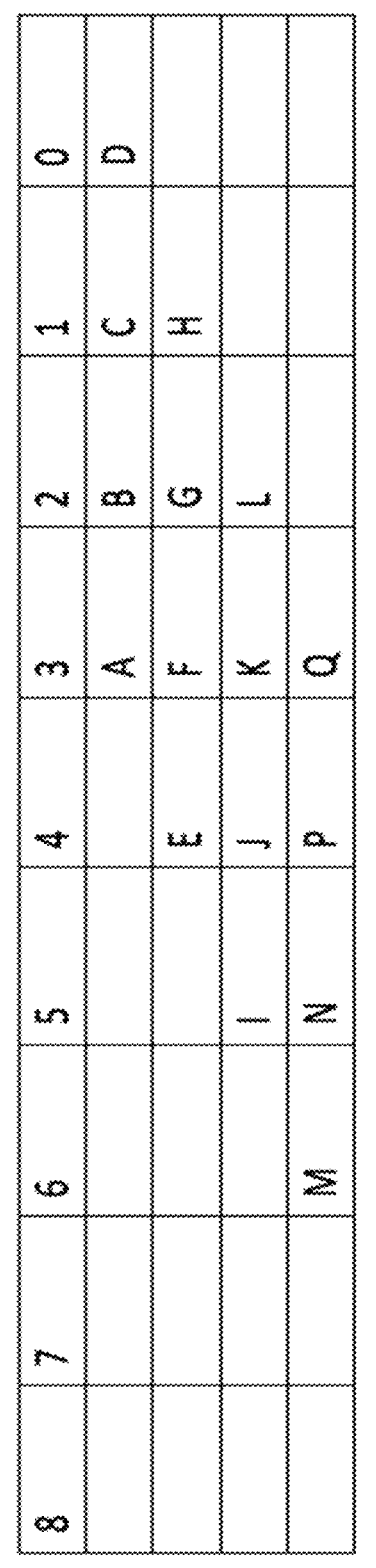

FIG. 9 illustrates an example of 4×4 signed multiplier partial products arranged to be processed by a plurality of broken carry chains according to an exemplary embodiment of the present disclosure. Similar to the example shown in FIG. 6, each bit is a product of a multiplicand bit and a multiplier bit. In this example, the multiplicand is X[3:0] and the multiplier is Y[3:0]. The bit values for A-N, and P-Q may be computed as described with reference to FIG. 6. No sign bit extensions are shown in FIG. 9.

In this example, A, B, C, and D may represent a partial product from partial product logic 1 501 (shown in FIG. 5). E, F, G, and H may represent a partial product from partial product logic 2 502 (shown in FIG. 5). I, J, K, and L may represent a partial product from partial product logic 3 503 (shown in FIG. 5). M, N, P, and Q may represent a partial product from partial product logic 4 504 (shown in FIG. 5). The logic function required for generating each of the bits of the partial products is an AND function.

FIG. 10A illustrates an example of 4×4 signed multiplier partial products arranged to be processed by a continuous carry chain according to an exemplary embodiment of the present disclosure. In order to arrange for a plurality of logical adders to be mapped to a single logical adder implemented on a single continuous carry chain, the sum must be correct with sign extension, but does not overflow into an appended operation. In FIG. 10A, a first partial product is extended with "A", but the second extension can be implemented as the XOR of the first extension, without overflow. The bit 4 position in FIG. 10A is designated as a position where no overflow can occur when summing values from a logical adder such that values to be summed by another logical adder can be placed at the next bit position.

The fourth partial product is added as the bitwise inverse of the multiplicand by the most significant bit of the multiplier. For example, if M=X[3] AND Y[3], M*=NOT (X[3] AND Y[3]).

FIG. 10B illustrates an example of a 4×4 signed multiplier summed partial products for computing a final sum arranged to be processed by a continuous carry chain according to an exemplary embodiment of the present disclosure. The two least significant bits already calculated are S1=P0, and S0=D.

The most significant partial product is in 1's complement format, however, the multiplier must be in 2's complement format. In order to affect this conversion, a '1' is added into the LSB position of the most significant partial product. This is required only when the multiplier is signed. If only the multiplicand is signed, this procedure is no required. As there is no place to do so in the canonic structure, an additional adder may be implemented to achieve this. Using an additional adder may be expensive, both in terms of resources and latency. If several multipliers are summed (as in the common DOT product situation of machine learning applications), a single representation of all conversion bits can be encoded and added as a single value.

It should be appreciated that if a multiplier is standalone, or if a final result is needed at an immediate output of the multiplier, an alternate method is may be performed, which is illustrated in FIG. 10B. The least significant bit of this section of the multiplier is the sum of P1 (from FIG. 10A) and L (from FIG. 9). After this, a 2:2 compression is applied to the partial products to insert a '0' into the next bit position. The most significant bit of the multiplier (Y[3] for the example of FIG. 9) can now be inserted into the nominal '0' position for the 1's to 2's complement conversion. The 2:2 compression includes redundant sum (XOR) and carry (AND) calculations. The inputs to the logic cells are supported by modern FPGA architectures.

FIG. 11 illustrates an example of 4×4 signed multiplier partial products and summed partial products arranged to be processed by a continuous carry chain according to an embodiment of the present disclosure. The 11-bit carry chain from FIG. 10A may be appended with the 6-bit carry chain from FIG. 10B. As shown, a single 17-bit carry chain may be used to implement the 4×4 unsigned multiplier.

Figure 12:
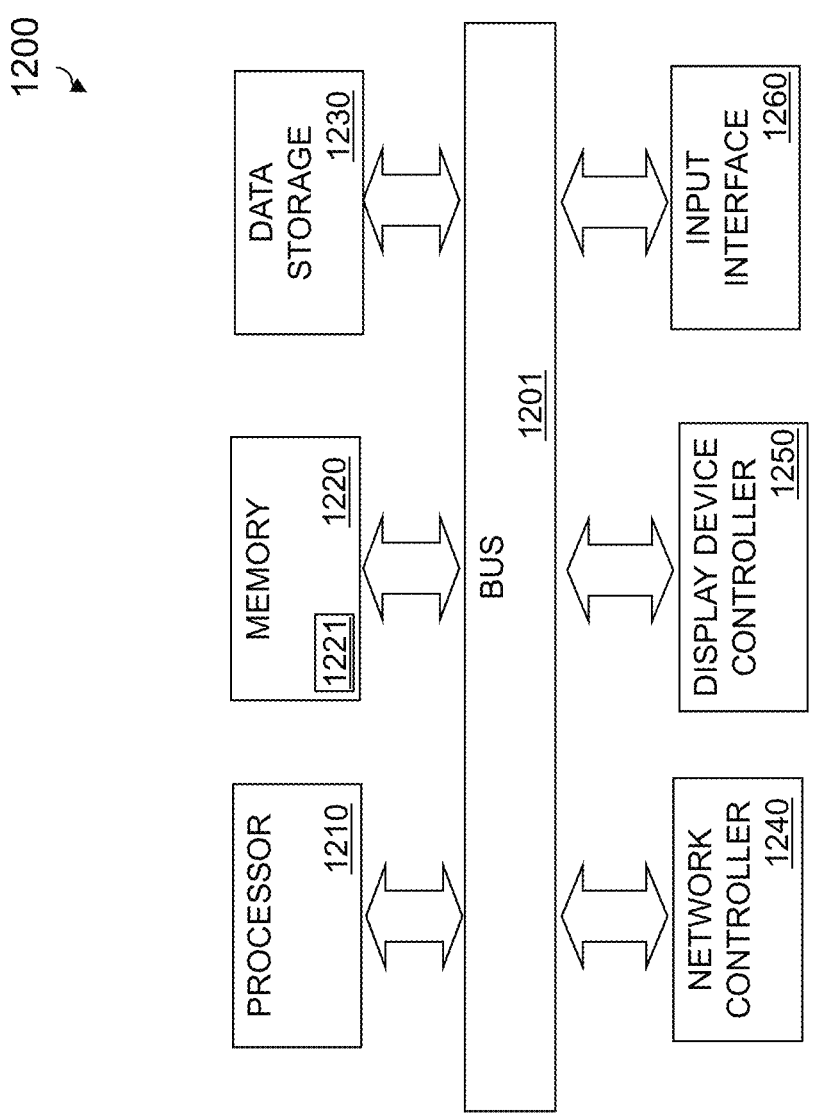
FIG. 12 illustrates a block diagram of a computer system implementing a system designer according to an exemplary embodiment of the present disclosure.

FIG. 12 is a block diagram of an exemplary computer system 1200 in which an example embodiment of the present disclosure resides. The computer system 1200 includes a processor 1210 that process data signals. The processor 1210 is coupled to a bus 1201 or other switch fabric that transmits data signals between processor 1210 and other components in the computer system 1200. The computer system 1200 includes a memory 1220. The memory 1220 may store instructions and code represented by data signals that may be executed by the processor 1210. A data storage device 1230 is also coupled to the bus 1201.

A network controller 1240 is coupled to the bus 1201. The network controller 1240 may link the computer system 1200 to a network of computers (not shown) and supports communication among the machines. A display device controller 1250 is coupled to the bus 1201. The display device controller 1250 allows coupling of a display device (not shown) to the computer system 1200 and acts as an interface between the display device and the computer system 1200. An input interface 1260 is coupled to the bus 1201. The input interface 1260 allows coupling of an input device (not shown) to the computer system 1200 and transmits data signals from the input device to the computer system 1200.

A system designer 1221 may reside in the memory 1220 and be executed by the processor 1210. The system designer 1221 may operate to perform synthesis, placement, routing, and timing analysis on a design for the system. According to an embodiment of the present disclosure packing with continuous carry chains is performed for a system during compilation. Packing with continuous carry chains involves mapping a plurality of logical adders onto a single logical adder implemented on a single continuous carry chain. According to an embodiment of the disclosure, the packing may be performed during design generation prior to synthesis, during synthesis, during placement, or during a different stage of compilation.

Figure 13:
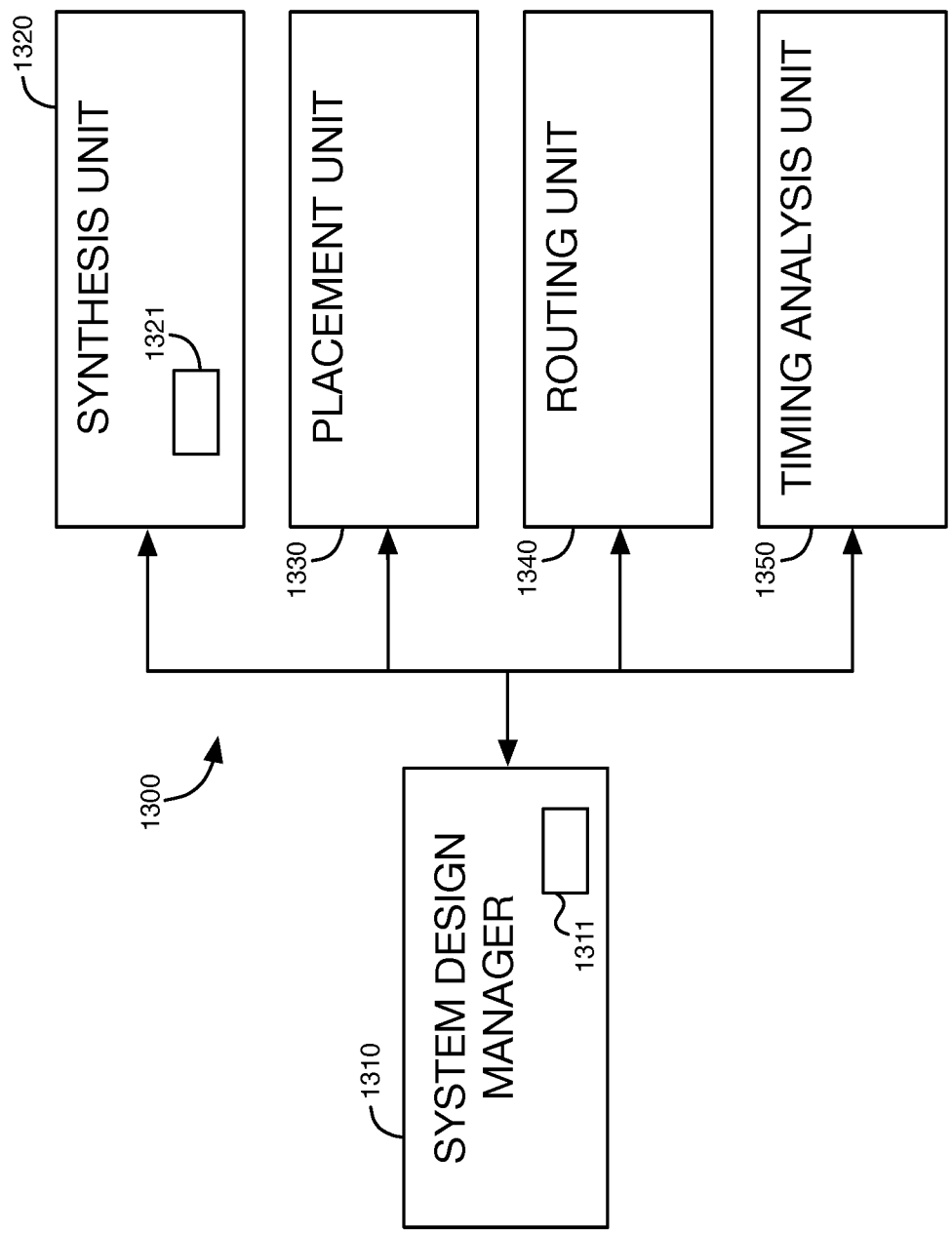
FIG. 13 is a block diagram of a system designer according to an exemplary embodiment of the present disclosure.

FIG. 13 illustrates a system designer 1300 according to an embodiment of the present disclosure. The system designer 1300 may be an EDA tool for designing a system on a target device such as an FPGA, application-specific integrated circuit (ASIC), structured ASIC, or other circuitry. FIG. 13 illustrates modules implementing an embodiment of the system designer 1300. According to one embodiment, the modules represent software modules and system design may be performed by a computer system such as the one illustrated in FIG. 12 executing sequences of instructions represented by the modules shown in FIG. 13. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software. The system designer 1300 includes a system designer manager 1310. The system designer manager 1310 is connected to and transmits data between the components of the system designer 1300. The system design manager 1310 includes a design generation unit 1311. According to an embodiment of the present disclosure, the design generation unit 1311 generates a design in response to input provided by a user. In this embodiment, the user may input a register-transfer-level (RTL) description of the system, select and connect logic from a design library, or utilize other design input options. Alternatively, the input provided by the user may be a computer language description of the system. In this embodiment, a high-level compilation of the computer language description of the system is performed. The design for the system generated may be in HDL.

The system designer 1300 includes a synthesis unit 1320. The synthesis unit 1320 takes a conceptual HDL design definition and generates an optimized logical representation of the system. The optimized logical representation of the system generated by the synthesis unit 1320 may include a representation that has a reduced number of functional blocks and registers, such as logic gates and logic elements, required for the system. Alternatively, the optimized logical representation of the system generated by the synthesis unit 1320 may include a representation that has a reduced depth of logic and that generates a lower signal propagation delay.

The synthesis unit 1320 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

According to an embodiment of the present disclosure, the synthesis unit 1320 includes a carry chain packing unit 1321. The carry chain packing unit 1321 maps a plurality of logical adders onto a single logical adder implemented on a carry chain. The carry chain packing unit 1321 may perform the procedures described with reference to FIG. 2. For example, the carry chain packing unit 1321 may designate bit positions on the carry chain where no overflow can occur when summing values from a first logical adder such that values from a second logical adder can be summed on the carry chain. The carry chain packing unit 1321 may map logic that computes first partial products to be summed by the logical adders to resources assigned to implement the carry chain. The carry chain packing unit 1321 may also map logic that computes second partial products to be summed by the logical adders to a resource other than the resources assigned to implement the carry chain. According to an alternate embodiment of the present disclosure, the carry chain packing unit 1321 may reside in the design generation unit 1311 or the placement unit 1330 and perform carry chain packing during design generation or placement.

The system designer 1300 includes a placement unit 1330 that processes the optimized technology-mapped netlist to produce a placement for each of the functional blocks. The placement identifies which components or areas on the target device are to be used for specific functional blocks and registers.

The system designer 1300 includes a routing unit 1340 that determines the routing resources on the target device to use to provide interconnection between the components implementing functional blocks and registers of the logic design.

The system designer 1300 includes a timing analysis unit 1350 that performs timing analysis to determine whether timing constraints of the system are satisfied.

The system designer manager 1310 may perform an assembly procedure that creates a program file that includes the design of the system. The program file may be a configuration bit stream that may be used to program the target device. The assembly procedure may output the program file onto the target device to program the target device, output the program file to a separate machine for further processing or for programing the target device, or output the program file to be stored. It should be appreciated that the assembly procedure may also output the design of the system in other forms and onto other devices such as a display device or other medium.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 14:
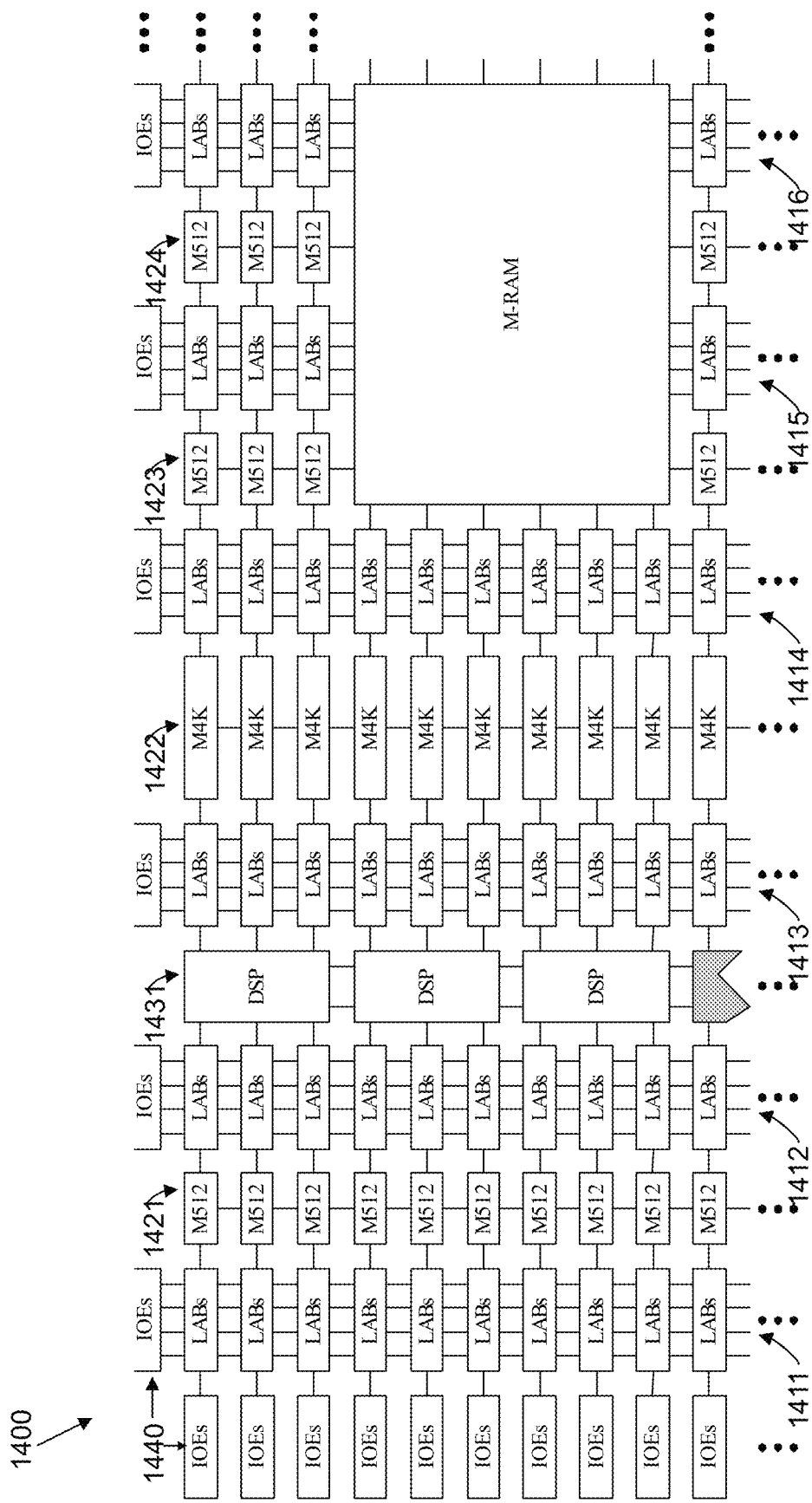
FIG. 14 illustrates an exemplary target device according to an exemplary embodiment of the present disclosure.

FIG. 14 illustrates a device 1400 that may be used to implement a target device according to an embodiment of the present disclosure. The device may be implemented on a die, as discussed above. The device 1400 is a field programmable gate array (FPGA) that includes a plurality of logic-array blocks (LABs). According to an embodiment of the present disclosure, the device 1400 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an embodiment of the present disclosure, the logic block may be implemented by an adaptive logic module (ALM), such as those found in Stratix devices manufactured by Altera Corporation which is wholly owned by Intel Corporation. LABs are grouped into rows and columns across the device 1400. Columns of LABs are shown as 1411-1416. It should be appreciated that the logic block may include additional or alternate components. It should be appreciated that a carry chain may be implemented with the resources of one or more LABs in the device 1400.

The device 1400 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1400. Columns of memory blocks are shown as 1421-1424.

The device 1400 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1400 and are shown as 1431.

The device 1400 includes a plurality of input/output elements (IOEs) 1440. Each IOE feeds an IO pin (not shown) on the device 1400. The IOEs 1440 are located at the end of LAB rows and columns around the periphery of the device 1400. Each IOE may include a bidirectional IO buffer and a plurality of registers for registering input, output, and output-enable signals.

The device 1400 may include routing resources such as LAB local interconnect lines, row interconnect lines ("H-type wires"), and column interconnect lines ("V-type wires") (not shown) to route signals between components on the target device.

The following examples pertain to further embodiments. In one embodiment, a method for designing a system on a target device, includes identifying a length for a carry chain that is supported by predefined quanta of a resource on the target device. A plurality of logical adders are mapped onto a single logical adder implemented on the carry chain subject to the identified length to increase logic utilization in a design for the system.

In a further embodiment, the method wherein the resource on the target device is a logic array block (LAB) and the predefined quanta of the resource are an integer multiple of the LAB.

In a further embodiment, the method wherein the resource on the target device is a logic array block (LAB) and the predefined quanta of the resource are an integer multiple of a half of the LAB.

In a further embodiment, the method further comprising designating bit positions on the carry chain where no overflow can occur when summing values from a first logical adder such that values from a second logical adder can be summed on the carry chain.

In a further embodiment, the method further comprising mapping logic that computes first partial products to be summed by the logical adders to the predefined quanta of resource assigned to implement the carry chain.

In a further embodiment, the method further comprising mapping logic that computes second partial products to be summed by the logical adders to a resource other than the predefined quanta of resource assigned to implement the carry chain.

In a further embodiment, the method wherein mapping the plurality of logical adders onto the single logical adder implemented on the carry chain further comprises removing one or more least significant bits or most significant bits from a summing operation to reduce a length required by the carry chain.

In a further embodiment, the method wherein mapping the plurality of logical adders onto the single logical adder implemented on the carry chain further comprises adding one or more least significant bit from a summing operation to increase a length required by the carry chain.

In a further embodiment, the method wherein the identifying and mapping is performed during synthesis.

In a further embodiment, the method wherein the identifying and mapping is performed during clustering.

In a further embodiment, the method wherein the identifying and mapping is performed during design generation prior to synthesis.

In a further embodiment, the method further comprising inserting zeros in the bit positions on the carry chain where no overflow can occur when the values from the first logical adder and the second logical adder are unsigned.

In a further embodiment, the method further comprising inserting an XOR value of a first partial product of values from the first logical adder in one of the bit positions on the carry chain where no overflow can occur when the values from the first logical adder and the second logical adder are signed.

In a further embodiment, the method further comprising generating a program file that includes the design, transmitting the program file onto the target device, and programming the target device with the program file to transform programmable resources to implement the design.

In a further embodiment, a non-transitory computer readable medium including a sequence of instructions stored thereon for causing a computer to execute a method for designing a system on a target device, that includes mapping a plurality of logical adders onto a single logical adder implemented on a single carry chain. Bit positions are designated on the carry chain where no overflow can occur when summing values from a first logical adder of the plurality of logical adders such that values from a second logical adder of the plurality of logical adders can be summed on the carry chain.

In a further embodiment, the non-transitory computer readable medium, wherein the method further comprises identifying a length for a carry chain that is supported by predefined quanta of a resource on the target device.

In a further embodiment, the non-transitory computer readable medium, wherein the predefined quanta of the resource are determined to allow for efficient logic utilization on the target device.

In a further embodiment, the non-transitory computer readable medium, wherein the method further comprises mapping logic that computes first partial products to be summed by the logical adders to a resource assigned to implement the carry chain.

In a further embodiment, the non-transitory computer readable medium, wherein the method further comprises mapping logic that computes second partial products to be summed by the logical adders to a resource other than the resource assigned to implement the carry chain.

In a further embodiment, the non-transitory computer readable medium, wherein the method further comprises generating a program file that includes the design, transmitting the program file onto the target device, and programming the target device with the program file to transform programmable resources to implement the design.

In a further embodiment, a system designer includes a design generation unit that generates a hardware description language (HDL) of a system to be implemented on a target device. The system designer includes a synthesis unit that synthesizes the HDL of the system on the target device to generate a synthesized system. The system designer includes a placement unit that places the synthesized system on the target device. The system designer includes a carry chain packing unit that maps a plurality of logical adders onto a single logical adder implemented on a carry chain to increase logic utilization in a design for the system, wherein the carry chain packing unit may be implemented on one of the design generation unit, synthesis unit, and the placement unit.

In a further embodiment, the system designer, wherein the carry chain packing unit designates bit positions on the carry chain where no overflow can occur when summing values from a first logical adder such that values from a second logical adder can be summed on the carry chain.

In a further embodiment, the system designer, wherein the carry chain packing unit maps logic that computes first partial products to be summed by the logical adders to resources assigned to implement the carry chain.

In a further embodiment, the system designer, wherein the carry chain packing unit maps logic that computes second partial products to be summed by the logical adders to a resource other than the resources assigned to implement the carry chain.

In a further embodiment, the system designer further comprises a system design manager that generates a program file that includes the design, transmits the program file onto the target device, and programs the target device with the program file to transform programmable resources to implement the design.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, comprising:
identifying a length for a carry chain that is supported by predefined quanta of a resource on the target device;
mapping a plurality of logical adders onto a single logical adder implemented on the carry chain subject to the identified length to increase logic utilization in a design for the system; and
designating a first bit position on the carry chain where no overflow occurs when summing values from a first logical adder that values from a second logical adder are summed on the carry chain and placed at a second bit position next to the first bit position.

2. The method of claim 1, wherein the resource on the target device is a logic array block (LAB) and the predefined quanta of the resource are an integer multiple of the LAB.

3. The method of claim 1, wherein the resource on the target device is a logic array block (LAB) and the predefined quanta of the resource are an integer multiple of a half of the LAB.

4. The method of claim 1, wherein designating the first bit position further comprises designating bit positions on the carry chain where no overflow occurs when summing the values from the first logical adder that the values from the second logical adder are summed on the carry chain.

5. The method of claim 1 further comprising mapping logic that computes first partial products to be summed by the logical adders to the predefined quanta of the resource assigned to implement the carry chain.

6. The method of claim 5 further comprising mapping logic that computes second partial products to be summed by the logical adders to a resource other than the predefined quanta of the resource assigned to implement the carry chain.

7. The method of claim 1, wherein mapping the plurality of logical adders onto the single logical adder implemented on the carry chain further comprises removing one or more least significant bits or most significant bits from a summing operation to reduce a length required by the carry chain.

8. The method of claim 1, wherein mapping the plurality of logical adders onto the single logical adder implemented on the carry chain further comprises adding one or more least significant bits from a summing operation to increase a length required by the carry chain.

9. The method of claim 1, wherein the identifying and mapping is performed during synthesis.

10. The method of claim 1, wherein the identifying and mapping is performed during clustering.

11. The method of claim 1, wherein the identifying and mapping is performed during design generation prior to synthesis.

12. The method of claim 4 further comprising inserting zeros in the bit positions on the carry chain where no overflow can occur when the values from the first logical adder and the second logical adder are unsigned.

13. The method of claim 4 further comprising inserting an XOR value of a first partial product of values from the first logical adder in one of the bit positions on the carry chain where no overflow can occur when the values from the first logical adder and the second logical adder are signed.

14. The method of claim 1 further comprising:
generating a program file that includes the design;
transmitting the program file onto the target device; and
programming the target device with the program file to transform programmable resources to implement the design.

15. A non-transitory computer readable medium including a sequence of instructions stored thereon for causing a computer to execute a method for designing a system on a target device, the method comprising:
mapping a plurality of logical adders onto a single logical adder implemented on a carry chain in a design for the system; and
designating a first bit position on the carry chain where no overflow occurs when summing values from a first logical adder of the plurality of logical adders that values from a second logical adder of the plurality of logical adders are summed on the carry chain and placed at a second bit position next to the first bit position.

16. The non-transitory computer readable medium of claim 15, wherein the method further comprises identifying a length for the carry chain that is supported by predefined quanta of a resource on the target device.

17. The non-transitory computer readable medium of claim 16, wherein the predefined quanta of the resource are determined to allow for efficient logic utilization on the target device.

18. The non-transitory computer readable medium of claim 15, wherein the method further comprises mapping logic that computes first partial products to be summed by the logical adders to a resource assigned to implement the carry chain.

19. The non-transitory computer readable medium of claim 18, wherein the method further comprises mapping logic that computes second partial products to be summed by the logical adders to a resource other than the resource assigned to implement the carry chain.

20. The non-transitory computer readable medium of claim 15, wherein the method further comprises:
generating a program file that includes the design;
transmitting the program file onto the target device; and
programming the target device with the program file to transform programmable resources to implement the design.

21. A system designer, comprising:
a design generation unit that generates a hardware description language (HDL) of a system to be implemented on a target device;
a synthesis unit that synthesizes the HDL of the system on the target device to generate a synthesized system;
a placement unit that places the synthesized system on the target device; and
a carry chain packing unit that maps a plurality of logical adders onto a single logical adder implemented on a carry chain to increase logic utilization in a design for the system, wherein the carry chain packing unit is implemented on one of the design generation unit, the synthesis unit, and the placement unit, and wherein the carry chain packing unit designates a first bit position on the carry chain where no overflow occurs when summing values from a first logical adder that values from a second logical adder are summed on the carry chain and placed at a second bit position next to the first bit position.

22. The system designer of claim 21, wherein the carry chain packing unit designates bit positions on the carry chain where no overflow occurs when summing the values from the first logical adder such that the values from the second logical adder are summed on the carry chain.

23. The system designer of claim 21, wherein the carry chain packing unit maps logic that computes first partial products to be summed by the logical adders to resources assigned to implement the carry chain.

24. The system designer of claim 23, wherein the carry chain packing unit maps logic that computes second partial products to be summed by the logical adders to a resource other than the resources assigned to implement the carry chain.

25. The system designer of claim 21 further comprising a system design manager that generates a program file that includes the design, transmits the program file onto the target device, and programs the target device with the program file to transform programmable resources to implement the design.

* * * * *